United States Patent
Løken d.y.

(10) Patent No.: US 8,423,770 B2
(45) Date of Patent: Apr. 16, 2013

(54) METHOD AND SYSTEM FOR PROVIDING SECURE CODES FOR MARKING ON ITEMS

(75) Inventor: Magnar Løken d.y., Oslo (NO)

(73) Assignee: Kezzler AS, Oslo (NO)

( * ) Notice: Subject to any disclaimer, the term of this patent is extended or adjusted under 35 U.S.C. 154(b) by 421 days.

(21) Appl. No.: 12/890,381

(22) Filed: Sep. 24, 2010

(65) Prior Publication Data

US 2011/0107100 A1     May 5, 2011

Related U.S. Application Data

(60) Provisional application No. 61/245,567, filed on Sep. 24, 2009.

(51) Int. Cl.
 *H04L 29/06*     (2006.01)
(52) U.S. Cl.
 USPC .............................. 713/170; 713/189; 726/30
(58) Field of Classification Search .................. 713/170, 713/189; 726/30
See application file for complete search history.

(56) References Cited

U.S. PATENT DOCUMENTS

| | | | |
|---|---|---|---|
| 6,442,276 B1 | 8/2002 | Doljack | |
| 2006/0180661 A1 | 8/2006 | Grant et al. | |
| 2008/0256367 A1* | 10/2008 | Grant | 713/189 |

FOREIGN PATENT DOCUMENTS

| | | |
|---|---|---|
| GB | 2 342 743 A | 4/2000 |
| WO | WO 03/007252 A1 | 1/2003 |

OTHER PUBLICATIONS

Authentication Technologies, "Kezzler's CDI for Numeric Protection," Authentication News, vol. 8, No. 7, p. 7, Sep. 2002.

* cited by examiner

*Primary Examiner* — Jeffrey Pwu
*Assistant Examiner* — Thong Truong
(74) *Attorney, Agent, or Firm* — Birch, Stewart, Kolasch & Birch, LLP

(57) ABSTRACT

A method and system for creating a group of marking codes for marking items in a code generation and validation system and validating the marking codes. The code generation and validation system includes a first subsystem and a second subsystem, where first and second keys in each of the subsystems are respectively used to encode a first input message in the first subsystem with an output message being the second input message in the second subsystem to solve the problem of data integrity of the validated data.

13 Claims, 4 Drawing Sheets

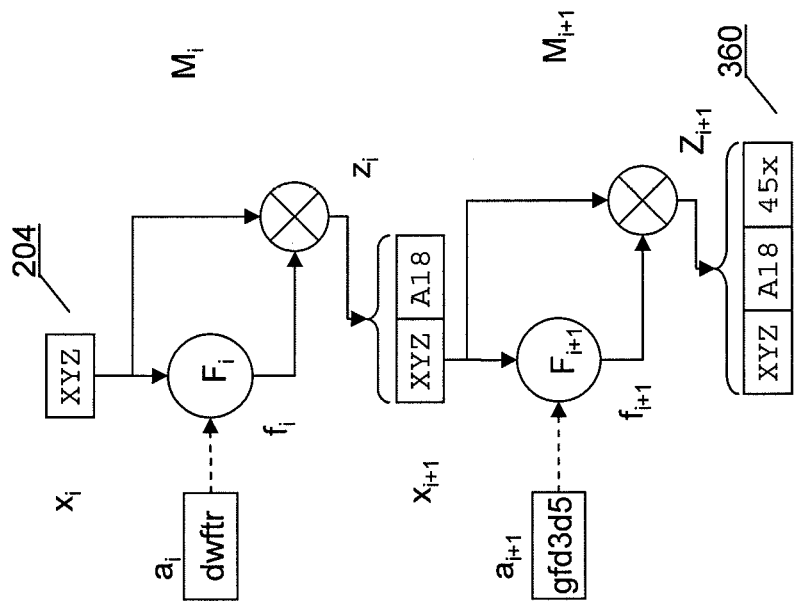
Fig. 4b
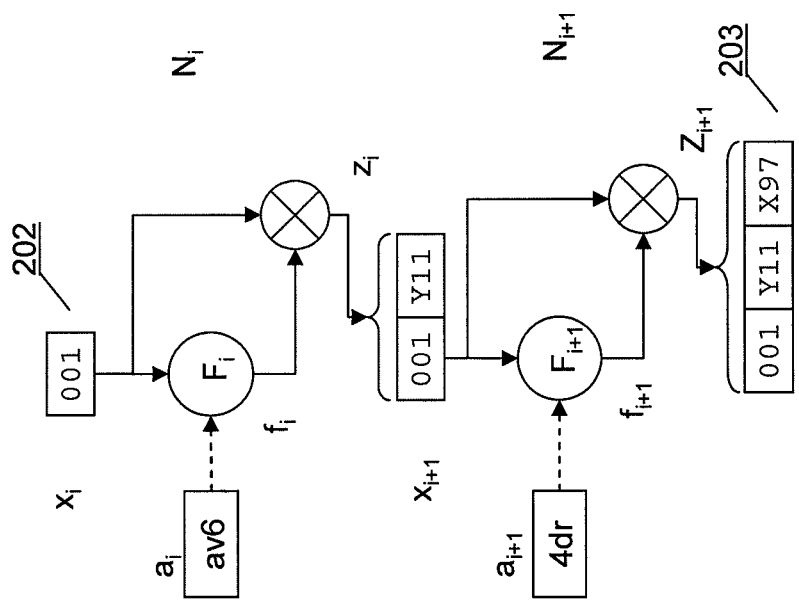
Fig. 4a
Fig. 4

METHOD AND SYSTEM FOR PROVIDING SECURE CODES FOR MARKING ON ITEMS

CROSS-REFERENCE TO RELATED APPLICATIONS

This nonprovisional application claims priority under 35 U.S.C. §119(e) on U.S. Provisional Application No. 61/245,567, filed on Sep. 24, 2009, the entirety of which is incorporated herein by reference.

INTRODUCTION

The present invention relates to a method and system for creating secure codes to be marked on objects for the purpose of subsequent authentication and tracking and tracing operations of the marked objects. More specifically, the invention relates to a method and system where data integrity within the code generation and validation system is improved by requiring two independent encoding processes and decoding processes. Such authentication or track and trace operations may be to authenticate persons, goods or other objects where the objective substantially is to decide whether some goods, person or other object is authentic in relation to given and specific information.

BACKGROUND ART

In many applications where authentication and track and trace takes place, single codes or pair of codes are used in an identification or confirmation process. For instance this takes place during logging on to certain pages on a computer network such as Internet or similar, or when using for instance identity cards, banking cards or similar. In such cases single codes, or pair of codes are generated which are known to a user and where a query in a database with one code obtains the other code. The user can then himself investigate whether the pair of codes is correct. In such cases the codes are generated in pairs which are defined in advance and stored for instance in a database.

All types of genuine goods and products, like branded clothes, jewelry and other consumer articles may be marked with a secure code. Further, medicines and medical equipment, critical parts for the industry, or parts for aircrafts or automobiles should be marked if product integrity and counterfeiting is a problem in the particular business. Unique objects related to services, such as drawings, documents, passports, security papers etc. may also be marked for the purpose of later authentication and/or track and trace operations.

Pair of codes is most often generated using so called "random number generators" that generates a series of random numbers. These numbers can again be expressed in many different ways so that they are expressed as codes in the desired form with desired characters, etc. Thus nobody should be able to guess or deduce the relation between the codes in a pair of codes consisting of two or more codes.

The disadvantage with such stored pairs of codes arises when the number of pairs of codes for instance is very high or the number of queries in the database is very high. In such case the access time for accessing the codes is increased. Further the database is getting very large when a large number of pairs of codes is generated.

This, is expensive in form of storage and computer processing capacity for referencing and other handling.

U.S. Pat. No. 6,442,276 (Doljack), describes a system and a method of verifying the authenticity of goods including generating one or more random codes and storing the one or more random codes in a database. The goods are then marked with one of the generated random codes such that each of the goods contain their own unique random code. Upon field checking and inventory of marked goods and comparing the codes on the marked goods to codes within the database, the authenticity of goods may be verified.

In GB2342743 (Elliot) a method of verifying the authenticity of goods is provided, wherein a set of public data and security code are applied to the goods, the security code having been derived from the public data by means of a predetermined encryption algorithm. Upon receiving a request for verification, the public data applied to the goods is entered into the predetermined encryption algorithm to generate a verification code. The verification code is then compared with the security code applied to the goods to assess the authenticity of goods.

In WO0300725 (Loken) describes a method for generating authentication information and use thereof in one or several subsequent authentication operations. The authentication information that is generated is consisting of at least a first authentication code and at least a second authentication code. The first code can be randomly chosen or otherwise obtained and the second code is generated on the basis of the first authentication code. Rather than storing the codes in a database they are regenerated for the purpose of validation or track and trace.

In Authentication News, Vol 8, No 7, September 2002 it is described a coding system to check the authenticity of a product where the codes are not stored in the database. The document also describes the use of Attached tagged information (ATI), allowing information, such as product type, manufacturing plant etc. to be linked automatically to the code and presented to the clients during authentication.

US2006/0180661 (Grant et al) describes a method and system for authenticating goods and thereby detecting and deterring counterfeits. According to one aspect of the invention, a client utilizes data received from a host to generate a plurality of security codes and to direct a printing device to print the plurality of security codes on a plurality of products, without retaining the plurality of security codes after the printing device has printed the plurality of security codes on the plurality of products. After the security codes have been printed, a person can communicate the security code to the host, which can verify its authenticity.

The background art described above is not able to address the need of clients requiring more control of the code generation and validation process, and the systems may be subject to fraud by someone being able to break into the systems. This could even be the system administrator.

SHORT SUMMARY OF THE INVENTION

The present invention provides a method and system for creating marking codes for marking items that overcomes the problems related to marking code generation in validation and track and trace systems according to background art. The current invention provides a method and system that ensures data integrity both for the validation result and for data in a track and trace system.

Problem

A problem related to code generation and validation and track and trace as described above for background art, is that the encoding and decoding processes related to code generation, validation and track and trace are generally performed within one single system, or within a single system domain administered by the same system administrators. As a consequence, it could potentially be possible for someone being able to break into such a system to hack or tamper with the data for the sake of their own business, such as returning positive validation of marking codes on goods or products that should not have been validated. Also administrators of coded generation and authentication systems have the access to data and the system, and could potentially change the system to his own benefit. For some users of authentication services, this potential security risk may be a considerable problem, and they may prefer in-house solutions that may be less optimised just to be able to control the systems. Likewise, for the service provider it may be a problem to sell and market the service when customers do not fully trust the system.

As has been described above, the current invention provides a method and system that further ensures data integrity and security for the users of the system. The invention discloses a first subsystem that to a great extent solves the problems with code generation and validation/track and trace systems where someone that is able to break into the system will be able to tamper with the data. With the additional security provided by the present invention, it will be almost impossible to generate and validate a marking code or a set of codes by obtaining unauthorised access to the system, such as by hacking. It also greatly reduces the possibility that a single system administrator can be able to validate codes in the system if he is tempted to do so. In this embodiment the invention comprises a first key associated with the group id, and a second key, in separate subsystems administered by different system administrators.

In an embodiment the invention is a method and system for creating a group of marking codes for marking items in a code generation and validation system and validating the marking codes. The code generation and validation system comprises a first subsystem and a second subsystem, where first and second keys in each of the subsystems, respectively are used to encode a first input message in the first subsystem with an output message being the second input message in the second subsystem.

According to an embodiment of the invention the marking codes can be generated at any time before the items are marked, and they are not stored in the code generation and validation system between the time of generation and the time of validation, rather they are generated by two independent one way functions in two independent systems, and regenerated by the same two way functions during authentication or track and trace processes. Both one way functions are using a secret key administered in two different systems, and at least one of the keys are dependent on the value of the code to be validated. The same one way functions is called during authentication, and a comparison between incoming data running through the one way functions and the item specific data running through the function will tell whether the marking code on the item is authentic or not.

In one aspect the invention is a method and system for creating a group of marking codes for marking items, comprising a first subsystem and a second subsystem, comprising the following steps;
  creating a group identifier for the group and associating the group identifier with a first key being unique for the group,
for each of the marking codes in the group;
  deriving a code relative identifier from a sequential number being unique within the group,
  merging the code relative identifier, the group identifier and the key to obtain a first input message,
  encoding in the first subsystem the first input message with a first one way function to obtain a first output message,
  merging in the second subsystem the first output message and a second key to obtain a second input message,
  encoding in the second subsystem the second input message, with a second one way function to obtain a second output message,
  merging the code relative identifier, the group identifier and one or more characters of the second output message to obtain a merged code, the merged code being the marking code.

In one aspect the invention is a method and system for validation of items marked with marking codes, comprising a first subsystem and a second subsystem, comprising the following steps;
  entering the marking code in the first subsystem, where the marking code is an incoming merged code comprising an incoming code relative identifier, an incoming group id and an incoming second output message,
  deriving an incoming sequential number from the incoming code relative identifier in the incoming merged code,
  comparing the incoming group identifier to a group identifier and invalidating the marking code if they are not identical,
  comparing the incoming sequential number to existing sequential numbers within a group indicated by the group id and invalidating the marking code if they are not identical,
  merging the code relative identifier, the group identifier and the key to obtain a first input message,
  encoding in the first subsystem the first input message with a first one way function to obtain a first output message,
  merging in the second subsystem the first output message and a second key to obtain a second input message,
  encoding in the second subsystem the second input message, with a second one way function to obtain a second output message,
  comparing the incoming second output message with the second output message and invalidating the marking code if they are not identical.

As can be understand from above, both subsystems must participate in the validation process to validate an item. However, the client system or the person validating the marked item cannot be sure that data has not been tampered with in the first subsystem and the first subsystem may send a positive validation without waiting for the outcome of the second subsystems. This problem has been solved in an embodiment of the invention where both subsystems are required to resond to a validation request.

According to the invention, even further security may be achieved by requiring both systems to send validation responses to the validation caller, i.e. the person or system who initiated the validation process by entering the marking code to be validated into the code generating and validation system. In this embodiment the method comprises the following steps:
  comparing the incoming second output message with the second output message in the first subsystem and invalidating the marking code if they are not identical,
  sending a validation response from the first subsystem,
  comparing the incoming second output message with the second output message in the second subsystem and invalidating the marking code if they are not identical,
  sending a validation response from the second subsystem,
  In an aspect of the current invention at least some of the item specific data is encoded by a two way function before it is added to the output from the one-way function. Since the item specific data, such as sequential number of the marking code within the group of generated codes, is used as the first validation check, such encoding will make it much more difficult for someone outside the system to tamper with the marked code and come up with the same output as the output encoded by the system. In this embodiment of the invention the step of creating the code relative identifier from a sequential number therefore comprises one or more sequential steps where each of the steps comprises;

combining a input value with a processed input value to an output value, where the input value of the next sequential step is the output value of the current sequential step, wherein the input value of the first of the sequential steps is the sequential number, and the output value of the last sequential step is the code relative identifier.

In an aspect the invention comprises the step looking up item or product specific data stored in the code generation and validation system before final validation of the marked item. Such item specific data may be dynamic flags that are updated during the lifetime of the marked item, indicating e.g. that the item or product has been withdrawn etc. According to an embodiment of the invention it is therefore possible that the item will not be valid, even if it was valid at the time it was marked with the marking code.

BRIEF DESCRIPTION OF THE DRAWINGS

The invention is illustrated in the attached drawing figures meant to illustrate preferred and alternate embodiments of the invention. The drawings shall not be construed to limit the invention which shall solely be limited by the claims.

FIG. 4a illustrates in a diagram how the step of creating a code relative identifier (203) from a sequential number (202) or from a unique number within the group (200) comprises a series of steps or sub-processes or functions.

FIG. 4b illustrates in a diagram how the step of encoding the input message (204) with a one way function (P2) to obtain an output message (360) may comprise two or more sequential steps to further obfuscate the output message (360).

EMBODIMENTS OF THE INVENTION

Examples of embodiments of the present invention will now be described in detail with reference to the accompanying drawings, in which:

The invention is illustrated in the attached drawing figures meant to illustrate preferred and alternate embodiments of the invention. The drawings shall not be construed to limit the scope of the invention which shall solely be limited by the attached claims.

Figure 1:
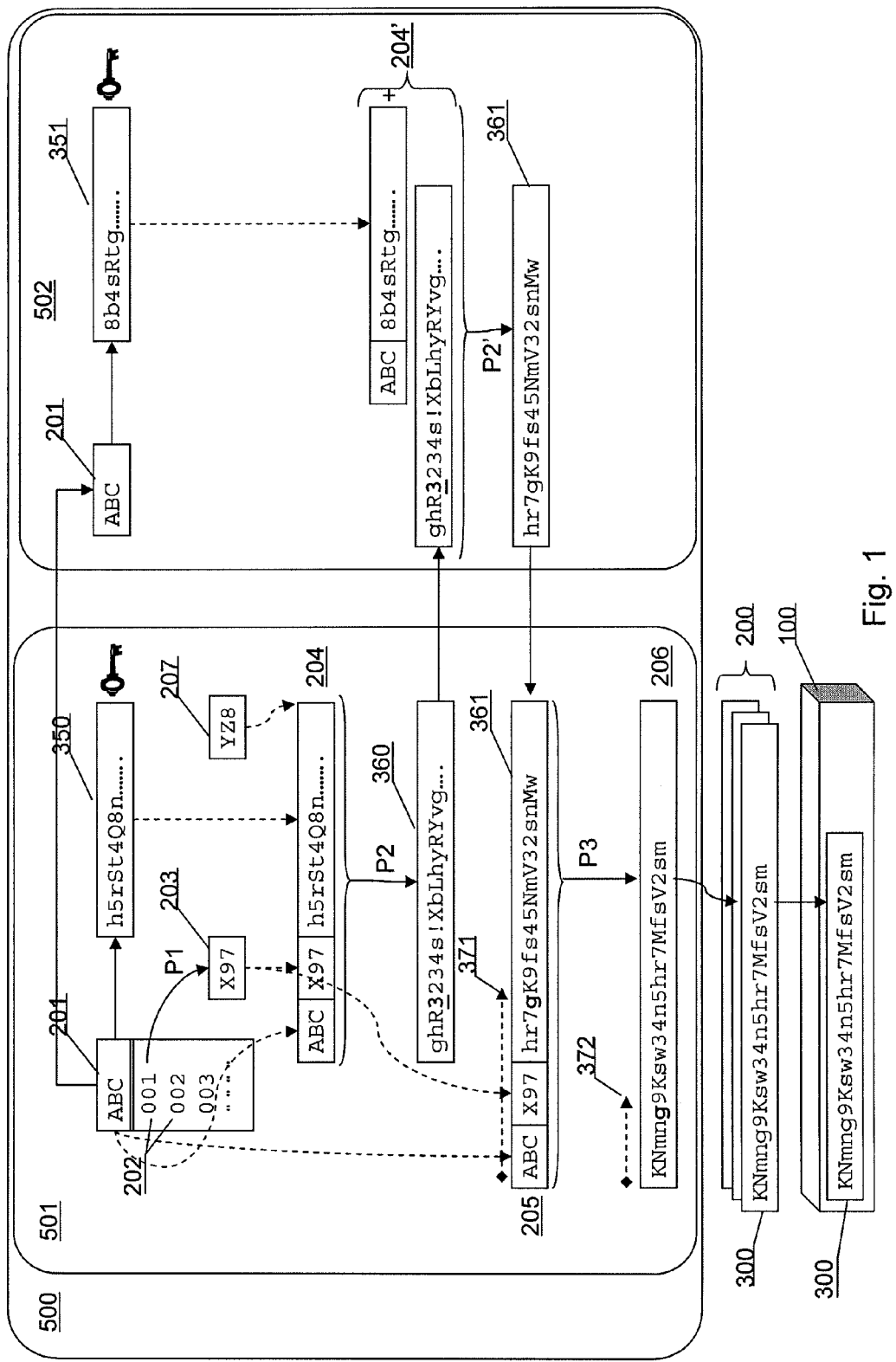
FIG. 1 illustrates in a diagram a code generation system (501) and a second subsystem (502) for improved security according to an embodiment of the invention, where generation and validation of codes only can be performed when both systems are involved, each with a separate encoding process and secret key.

Referring to FIG. 1 of the drawings illustrating an embodiment of the present invention, where a code generation and authentication system (500) arranged for generating a group (200) of unique marking codes (300) for marking items (100) is shown.

The number of unique codes (300) generated in a group (200) may depend on the number of items to be manufactured or packaged, but the number of generated unique codes is not critical since there is no relationship between the generated unique codes and the items (100) before they are marked on items and corresponding information has been recorded in the packaging management system or code generation and authentication system (500). The preparation may be done before the manufacturing process has started or even before the production line has been set up. A packaging management system, comprising a software system working in concert with an integrated or otherwise in connection with peripheral production machinery and other equipment such as printers and various type of scanners is provided with the group of unique codes from the track and trace system. The transportation method of the unique codes (300) is not central to the present invention and can be carried out using known techniques such as secure file transfer over the Internet, or the unique codes might be transferred using any other suitable digital media.

The packaging management system then carries out the process of marking the relevant unique codes onto the items (100).

In this embodiment of the invention a first subsystem (501) of the code generation and authentication system (500) gives the group a unique group id (201), where the group id (201) may be derived from a batch number, a number input by an operator of the system, a number assigned by the system, or any other number that is unique for this group id (201). The group id (201) is a general identifier that is stored in the first subsystem (501) or in any other system where it may later be retrieved. For the purpose of later encoding, the group id (201) is associated with a first key (350) that is unique for the group (200) and group id (201). The association between the group id (201) and the first key (350) as well as the first key (350) itself should be securely stored in the first subsystem (501) or in any other system available to the first subsystem (500).

Next, a unique identifier (202) for each of the marking codes to be generated in the group is generated. In an embodiment the unique identifier (202) is an increasing or decreasing sequential number, but it may be any unique set of values within the group (200). In an embodiment of the invention the unique identifier or sequential number (202) is only used as a source for deriving a code relative identifier (203) from the sequential number (202) in a two way function (P1). The process of deriving (P1) the code relative identifier (203) may be any two way function that is able to associate the sequential number (202) with the code relative identifier (203). In its simplest form the function may be a look-up table with one column for sequential numbers (202) and a second column for code relative identifiers (203), or e.g. a predefined binary operation. In another embodiment of the invention this function may be a sequence of interrelated functions, as will be described later.

The code relative identifier (203), the group identifier (201) and the first key (350) are then merged to obtain a first input message (204). In one embodiment the group id (201), the code relative identifier (203), and the first key (350) are simply concatenated, but any other merge may be used, where e.g. the first key (350) is added first, or where characters of each of the elements are merged with each other to further obfuscate the first input message (204).

Next, the input message is encoded with a one way function (P2) where the resulting output is an output message (360). The one way function (P2) may be a cryptographic one way function, such as a cryptographic hash function or any other hash function or one way function considered sufficiently hard to invert to give the desired level of security. The first output message (360) is a key element of the final marking code (300), that is derived from the group, a key related to the group, and the specific item.

The input message is often called "message" within the field of cryptography, and the output value may also be referred to as the digest or message digest. One way functions used for the invention should have the following characteristics;

easy to compute the output value for any given input value,
infeasible, or at least very difficult with state of the art hacking technology to find a message that has a output message, and to modify an input message without modifying the output message. Two different input messages should not have the same output message.

In an embodiment of the present invention as illustrated in FIG. 1 for creating a group (200) of marking codes (300) for marking items (100) two subsystems are used (501, 502).

Initially, the group id (201), the code relative identifier (203) and the output message (360) have been created in the way thoroughly described above in the code generation and validation system (501). The next step is to transfer a copy of the output message (360) to the second subsystem (502).

Next the output message (360) received from the code generation and validation system (501) and a second unique key (351) are merged into a second input message (204'). In one embodiment the output message (360), and the second key (351) are simply concatenated, but any other merge may be used, where e.g. the second key (351) is added first, or where characters of each of the elements are merged with each other to further obfuscate the second input message (204').

Next, the input message is encoded with a second one way function (P2) where the resulting output is a second output message (361). In an embodiment this encoding takes place in the second subsystem (502). The second one way function (P2) may be a cryptographic one way function, such as a cryptographic hash function or any other hash function or one way function considered sufficiently hard to invert to give the desired level of security. In this embodiment of the invention the second output message (361) is then sent back to the code first subsystem (501).

The group id (201) and the code relative identifier (203), are then combined with one or more characters of the second output message (361) where the resulting output is a merged code (205). In an embodiment of the invention the merged code (205) is simply the concatenation of the group id (201) and the code relative identifier (203) combined with one or more characters of the second output message (361), but any other combination or merge may be used, where e.g. the code relative identifier (203) is added first, or where characters of each of the elements are combined with each other to further obfuscate the merged code (205). In an embodiment this merged code (205) is a marking code (300) to be used for the marking of an item (100).

In an embodiment the present invention is a method for creating a group (200) of marking codes (300) for marking items (100) in a code generation and validation system (500) comprising a first subsystem (501) and a second subsystem (502), the method comprising the following steps;

creating a group identifier (201) for the group (200) and associating the group identifier (201) with a first key (350) being unique for the group (200), for each of the marking codes (300) in the group (200);

deriving (P1) a code relative identifier (203) from a sequential number (202) being unique within the group (200), merging the code relative identifier (203), the group identifier (201) and the key (350) to obtain a first input message (204), encoding in the first subsystem (501) the first input message (204) with a first one way function (P2) to obtain a first output message (360), merging in the second subsystem (502) the first output message (360) and a second key (351) to obtain a second input message (204'), encoding in the second subsystem (502) the second input message (204'), with a second one way function (P2) to obtain a second output message (361), merging the code relative identifier (203), the group identifier (201) and one or more characters of the second output message (361) to obtain a merged code (205), the merged code (205) being the marking code (300).

The invention is in an embodiment a code generation and validation system (500), or a track and trace system comprising a first subsystem (501) and a second subsystem (502), where;

the first subsystem (501) is arranged for creating a group identifier (201) for the group (200) and associating the group identifier (201) with a first key (350) being unique for the group (200), and for each of the marking codes (300) in the group (200);

deriving (P1) a code relative identifier (203) from a sequential number (202) being unique within the group (200), merging the code relative identifier (203), the group identifier (201) and the key (350) to obtain a first input message (204), encoding in the first subsystem (501) the first input message (204) with a first one way function (P2) to obtain a first output message (360), and the second subsystem (502) arranged for merging the first output message (360) and a second key (351) to obtain a second input message (204') and encoding the second input message (204'), with a second one way function (P2) to obtain a second output message (361), and the first subsystem (501) arranged for merging the code relative identifier (203), the group identifier (201) and one or more characters of the second output message (361) to obtain a merged code (205), the merged code (205) being the marking code (300).

As can be seen from FIG. 1 the second key (351) is in an embodiment of the invention be associated with the group id (201) to allow the second subsystem (502) to have different keys for each group (200) of generated marking codes. In this embodiment the second subsystem (502) stores the relationships between group ids (200) and second keys (351) to be used for later validation or track and trace management of an item marked with a marking code (300). In this embodiment the group id (201) is transferred from the first subsystem to the second subsystem for lookup of the associated second key (351) before encoding of the second output message (361). In one embodiment the second input message (204') comprises also the group id (201).

In an embodiment of the invention the one way function (P2) is a cryptographic one way function, such as a hash function. Other one-way functions with similar characteristics may also be used, as will be understood by a person skilled in the art.

In an embodiment the merged code (205) is further obfuscated by rearranging positions of characters of the merged code (205) in a rearranging function (P3).

The sub-systems (501, 502) are preferably concealed systems with different administrators.

In an embodiment the combined code is further obfuscated by rearranging positions of characters of the merged code (205) in a rearranging function (P3). The specific rearranging function (P3) used may be indicated by a value (371) in a fixed position of the merged code (205). The rearranged combined code (206) should comprise a value (372) in a predefined position indicating a reverse rearranging function (P3') to be able to re-arrange the characters back to their initial position when authenticating the marked item (100) later In an embodiment of the invention the method of generating a group of marking codes comprises the step of rearranging positions of characters of the merged code (205) in a rearranging function (P3), where the specific rearranging function (P3) used is indicated by a value (371) in a fixed position of the merged code (205), a result of the rearranging function (P3) is a rearranged concatenated code (206), and a specific inverse rearranging function (P3') is indicated by a value (372) in a fixed position of the rearranged concatenated code (206), the rearranged concatenated code (206) being the marking code (300).

According to an embodiment of the invention, a marking code (300) generated by a code generation and validation system comprising two subsystems (501, 502) as described above, must also be validated by the same two systems. The validation according to an embodiment of the invention of a marking code will now be described with reference to FIG. 2.

First, the marking code (300) is entered into the first subsystem (501). The marking code may be entered by a user with a authentication interface in a web browser, or by an operator talking to a user on the phone who wants to validate a marked item (100), or by any other way of entering a marking code in the system as will be understood by a person skilled in the art.

If the characters have been interchanged as described for an embodiment of the invention above, the characters should first be re-arranged back to the initial order to obtain the incoming merged code (205'). This is done in the rearranging function (P3') indicated by a value (372') in a specific position of the rearranged combined code (206'). Only a validation system with the knowledge of the value (372') in the fixed position and possession of the rearranging function (P3') will be able to rearrange the characters in the right way. If rearrangement fails due to that e.g. the position of the value (372') does not exist, or is an illegal value, or does not point to a valid rearranging function (P3'), the validation should fail.

In an embodiment the present invention comprises the step of rearranging positions of characters of the marking code (300) being an incoming rearranged concatenated code (206') in an inverse rearranging function (P3'), where the inverse rearranging function (P3') used is indicated by a value (372) in a fixed position of the incoming rearranged concatenated code (206'), where a result of the inverse rearranging function (P3) is the incoming merged code (205').

The next step in validation of the incoming marked code (300) is to derive the group id (201'), the incoming code relative identifier (203'), and the incoming first output message (360') from the incoming merged code (205').

According to an embodiment of the invention the incoming group id (201') will then be compared to the stored group ids (201) to see if a match can be found (Q1). If an identical group id cannot be found, the validation will fail. If, however, the incoming group id (201') is identical to a group id (201) in the first subsystem (501), the validation continues and the system tries to derive an incoming sequential number (202') from an incoming code relative identifier (203') by the two way function (P1) associated with the group id (201'). If an incoming sequential number (202') cannot be derived (Q2), the validation fails.

The next step in this validation process according to an embodiment of the invention is to create a merged code (205) from the incoming code relative identifier (203') and incoming group id (201') in the first subsystem (501), which are now found to be identical to the stored code relative identifier (203) and stored group id (201), respectively. The merged code (205) is created in a one-way function in the same way as it was done when creating the marking codes (300) before the items (100) were marked as further described below:

The code relative identifier (203), the group identifier (201) and the first key (350) are merged to obtain an input message (204). In one embodiment the group id (201), the code relative identifier (203), and the first key (350) are simply concatenated, but any other merge may be used, where e.g. the first key (350) is added first, or where characters of each of the elements are merged with each other to further obfuscate the input message (204).

Next, the input message is encoded with a one way function (P2) where the resulting output is a first output message (360). The one way function (P2) may be a cryptographic one way function, such as a cryptographic hash function or any other hash function or one way function considered sufficiently hard to invert to give the desired level of security.

Then, the first output message (360) is sent over to the second subsystem (502), where an output message will be generated as described above for code generation. The incoming output message (360) received from the first subsystem (501) and the second unique key (351) are merged into a second input message (204'). In one embodiment the first output message (360), and the second key (351) are simply concatenated, but any other merge may be used, where e.g. the second key (351) is added first, or where characters of each of the elements are merged with each other to further obfuscate the second input message (204').

The second input message (204') is encoded with a second one way function (P2') where the resulting output is a second output message (361). The second one way function (P2') may be a cryptographic one way function, such as a cryptographic hash function or any other hash function or one way function considered sufficiently hard to invert to give the desired level of security. In an embodiment of the invention the second output message (361) is sent back to the first subsystem (501).

The incoming second output message (361') is then compared to the output message (361) calculated by the second subsystem (502). If they are not identical (Q3) the validation will fail. However, if they are identical the validation process according to an embodiment of the invention has succeeded, and the code generation and validation system (500) will return a successful validation of the marking code (300) that was entered into the system.

In an embodiment the invention is a method for authenticating an item (100) marked with a marking code (300) in a code generation and validation system (500) comprising a first subsystem (501) and a second subsystem (502), the method comprising the following steps;

entering the marking code (300) in the first subsystem (501), where the marking code is an incoming merged code (205') comprising an incoming code relative identifier (203'), an incoming group id (201') and an incoming second output message (361'), deriving an incoming sequential number (202') from the incoming code relative identifier (203') in the incoming merged code (205'), comparing the incoming group identifier (201') to a group identifier (201) and invalidating the marking code (300) if they are not identical, comparing the incoming sequential number (202') to existing sequential number (202') within a group (200) indicated by the group id (201) and invalidating the marking code (300) if they are not identical, merging the code relative identifier (203), the group identifier (201) and the key (350) to obtain a first input message (204), encoding in the first subsystem (501) the first input message (204) with a first one way function (P2) to obtain a first output message (360), merging in the second subsystem (502) the first output message (360) and a second key (351) to obtain a second input message (204'), encoding in the second subsystem (502) the second input message (204'), with a second one way function (P2) to obtain a second output message (361), comparing the incoming second output message (361') with the second output message (361) and invalidating the marking code (300) if they are not identical.

Figure 2:
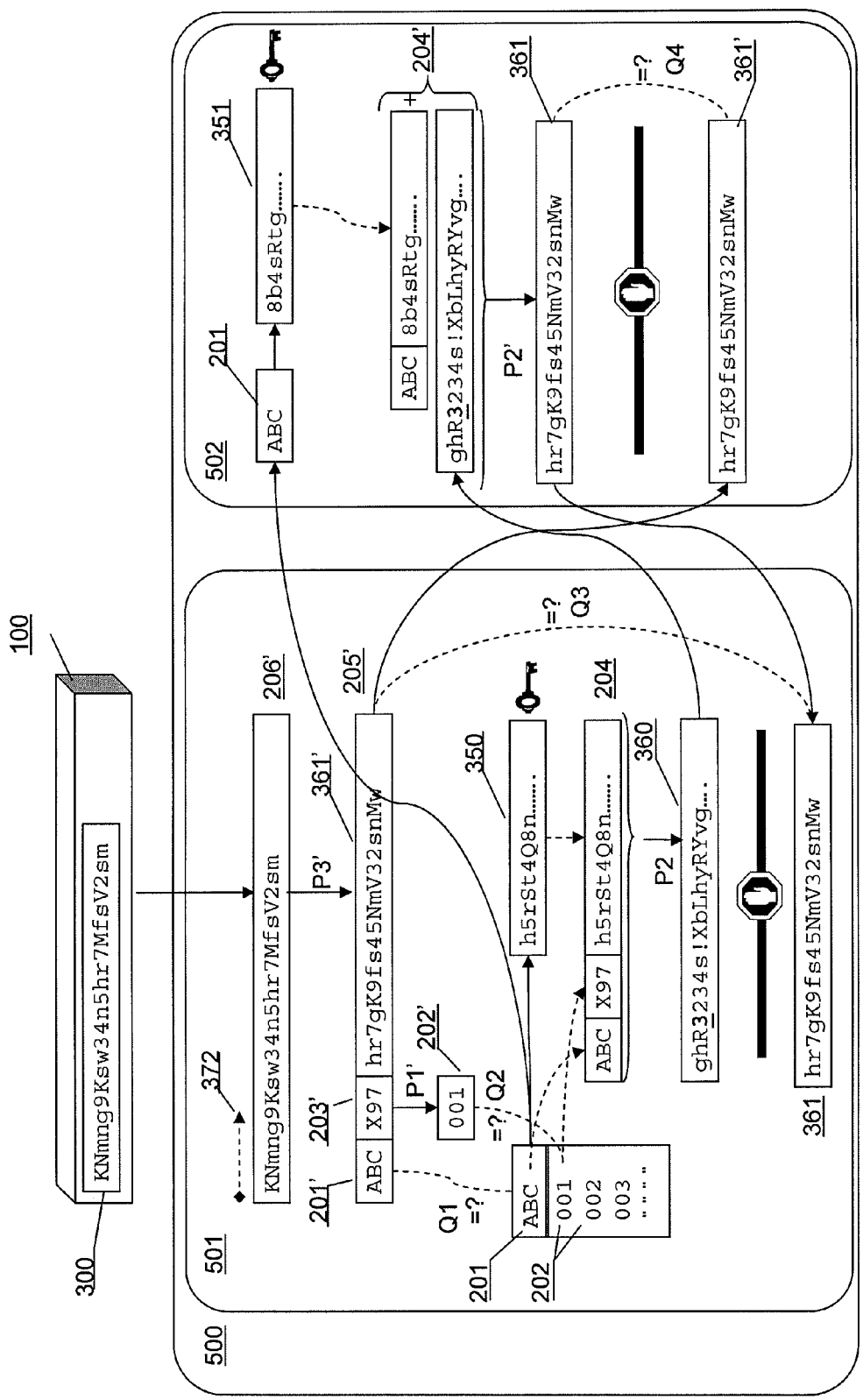
FIG. 2 illustrates in a diagram a how a marked item (100) is validated in a code generation and validation system (500) comprising a first subsystem (501) and a second subsystem (502) according to an embodiment of the invention.

As can be seen from FIG. 2 the second key (351) is in an embodiment of the invention be associated with the group id (201) to allow the second subsystem (502) to have different keys for each group (200) of generated marking codes. In this embodiment the second subsystem (502) stores the relationships between group ids (200) and second keys (351) to be used for later validation or track and trace management of an item marked with a marking code (300). In this embodiment the group id (201) is transferred from the first subsystem to the second subsystem for lookup of the associated second key (351) before encoding of the second output message (361).

As can be understand from above, both subsystems must participate in the validation process to validate an item. However, the client system or the person validating the marked item cannot be sure that data has not been tampered with in the first subsystem and the first subsystem may send a positive validation without waiting for the outcome of the second subsystems. This problem has been solved in an embodiment of the invention where both subsystems are required to respond to a validation request.

In an embodiment of the invention the security of the code generation and validation process is therefore further improved by providing a second validation response from the second subsystem (502) to the person or system that requested validation, in addition to the validation response from the master code generation and validation system (501). If the person or system requesting the validation do not get a valid response from both systems, the marking code should not be validated. In an embodiment the second subsystem (502) will only validate the marking code if it recognises the group identifier (201) transferred from the code generation and validation system (501) and the incoming output message (361') transferred from the code generation and validation system (501) is identical (Q4) to the output message (361) calculated by the second subsystem (502). A non-validate response may be sent from the second subsystem (502) if validation is not successful.

In an embodiment the invention comprises the steps of comparing the incoming second output message (361') with the second output message (361) in the first subsystem (501) and invalidating the marking code (300) if they are not identical, sending a validation response from the first subsystem (501), comparing the incoming second output message (361') with the second output message (361) in the second subsystem (502) and invalidating the marking code (300) if they are not identical, sending a validation response from the second subsystem (502), In an embodiment of the invention the step of creating (P1) the code relative identifier (203) from a sequential number (202) or from a unique number within the group (200) comprises a series of steps or subprocesses where each step or subprocess contributes to create the final code relative identifier. A main principle is that the result of a step is an input to the next step.

In FIG. 4a it is shown a process for deriving a code relative identifier (203) from the sequential number (202) according to an embodiment of the invention. In each of the sequential steps an input value ($x_1$) is processed in a sub-process or a function ($F_i$) resulting in value ($z_i$). In an embodiment the value ($F_i$) of the sub-process is combined with the input value ($x_1$) to create an output value ($z_i$). However, it is also within the scope of the invention that the value ($f_i$). is not combined with the input value ($x_1$).

In an embodiment of the invention the step of creating (P1) the code relative identifier (203) from a sequential number (202) comprises one or more sequential steps (N) where each (i) of the steps (N) comprises;

combining a input value ($x_1$) with a processed input value ($f_i$) to an output value ($z_i$), where the input value ($x_i$) of the next sequential step (i+1) is the output value ($z_{i+1}$) of the current sequential step (i), wherein the input value ($x_1$) of the first of the sequential steps (i=1) is the sequential number (202), and the output value of the last sequential step (i=N) is the code relative identifier (203).

In an embodiment of the invention, object information ($a_i$) related to the item (100) to be marked or related to a production process for the item may be used as an input value for one or more sequential steps when deriving a code relative identifier from a sequential number (202) or from a unique number within the group (200). Such information could be package date, production date, serial number, information about the manufacturer, or other relevant information that is unique for the production process, the marking process or the item.

In an embodiment the step of creating (P1') an incoming sequential number (202') from an incoming code relative identifier (203') comprises one or more sequential steps (N') where each (i') of the steps (N') comprises;

combining an input value ($x_{i'}$) with a processed input value ($f_{i'}$) to an output value ($z_{i'}$), where the input value ($x_{i'}$) of the next sequential step (i+1') is the output value ($z_{i'}$) of the current sequential step (i'), wherein the input value ($x_{1'}$) of the first of the sequential steps (i=1') is the incoming code relative identifier (203'), and the output value of the last sequential step (i=N) is the incoming sequential number (202').

In an embodiment of the invention the step of encoding the input message (204) with a one way function (P2) to obtain an output message (360) may comprise two or more sequential steps to further obfuscate the output message (360) as described in FIG. 4b.

This embodiment of the invention comprises one or more sequential steps (M) where each (j) of the steps (M) comprises;
combining an input value ($x_j$) with a processed input value ($fj_i$) to an output value ($z_j$), where the input value ($x_j$) of the next sequential step (j+1) is the output value ($z_j$) of the current sequential step (j), wherein the input value ($x_j$) of the first of the sequential steps (j=1) is the input message (204), and the output value of the last sequential step (j=M) is the output message (360).

One or more of the sequential steps may include a one way function, such as a cryptographic hash function.

In an embodiment of the invention, a unique value (207) is derived (P4) from the code relative identifier (203) and the group identifier (201). The unique value is in this embodiment used in the first input message (204). In this embodiment the method comprises the following steps;
deriving a unique value (207) from a combination of the code relative identifier (203) and the group identifier (201),
merging the unique value (207) with the code relative identifier (203), the group identifier (201), and the key (350) to obtain the input message (204).

The unique value (207) is used as a check value during the validation process, by a reverse process (P4'). The processes (P4, P4') may be associated with the group id (201).

During the validation process an incoming unique value (207') may be compared to a unique value (207) derived from the code relative identifier (203) and the group identifier (201). The process for deriving the unique value may be unique for a specific group identifier. (201).

Figure 3:
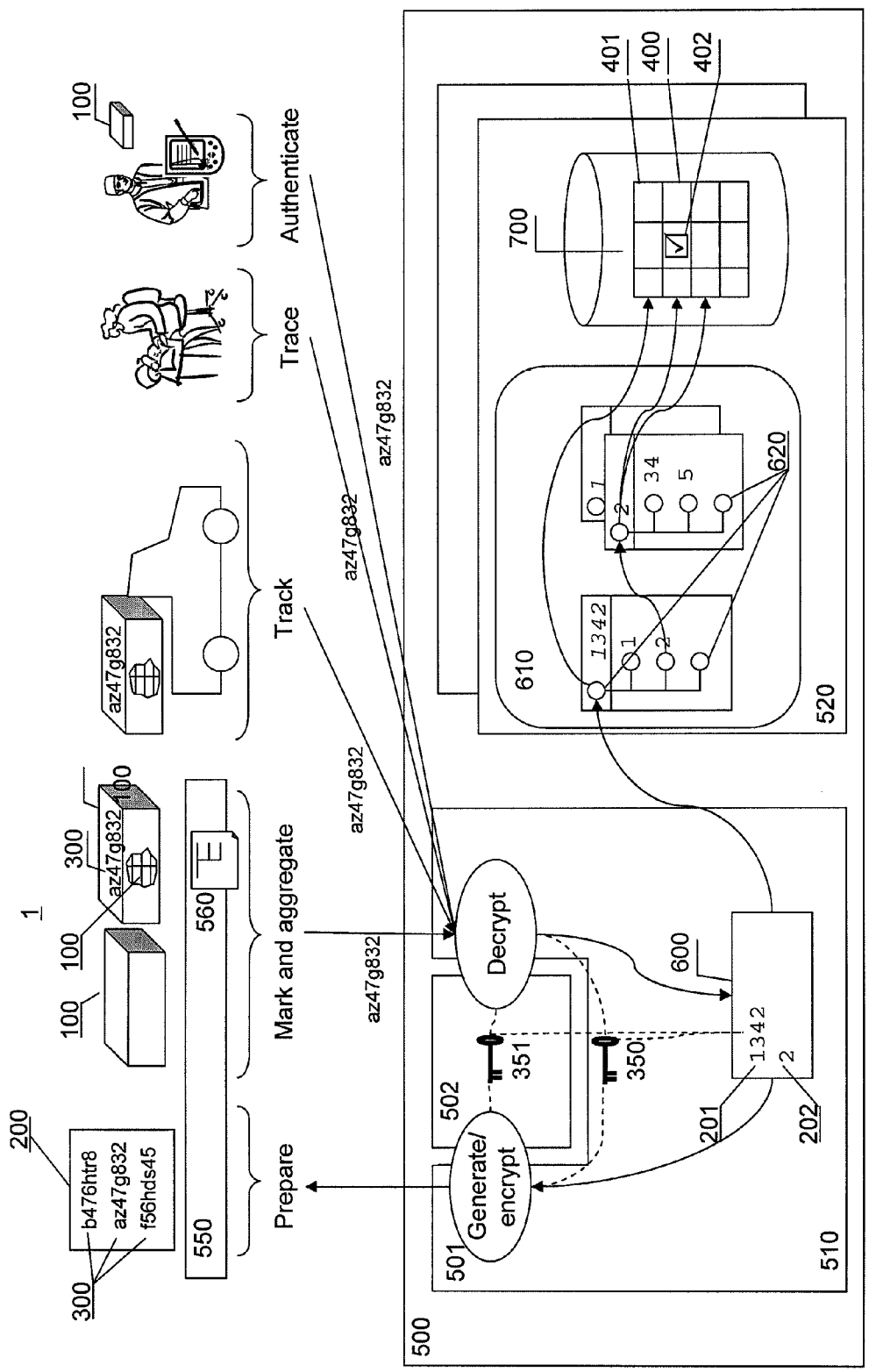
FIG. 3 illustrates in a block diagram a code generation and validation or track and trace system (500) according to the invention and use cases for the preparation, marking, track and trace and validate processes. It also shows a system architecture for managing marked item (100) related information in a hierarchical structure according to an embodiment of the invention.

The method for code generation and validation according to the invention as described above, may also be used for track and trace systems, or more advanced validation systems with one or more data records representing information about a specific marking code (300) in the validation or track and trace system. FIG. 3 illustrates an embodiment of the invention with code generation, track and trace and validation of the marked item (100).

The upper part of the figure depicts typical use-cases in typical validation and track and trace scenarios, whereas the lower part depicts an example of a system architecture used for implementing a validation or track and trace system according to the invention where item related information is stored in the track and trace or validation system.

The following use-cases which in the following will be described in more detail are; preparation for the track and trace process, marking of items and aggregation of packaging relationships, tracking items, tracing items and authenticating of items. In addition, related information handled by the system will be described in relation to the use-cases.

In the preparation for the tracking and tracing of information in the prepare use case in FIG. 3, a batch, or a group (200) of unique codes (300) are generated and encrypted with the first and second keys (350, 351) in a first and second subsystem (501, 502) according to the invention. The number of unique codes (300) generated in a group (200) may depend on the number of items to be manufactured or packaged, but the number of generated unique codes is not critical since there is no relationship between the generated unique codes and the items (100) before they are marked on items and corresponding information has been recorded in the packaging management system or the code generation and validation system or track and trace system (500). The preparation may be done before the manufacturing process has started or even before the production line has been set up. A packaging management system (550), comprising a software system working in concert with an integrated or otherwise in connection with peripheral production machinery and other equipment such as printers and various type of scanners is provided with the group of unique codes from the track and trace system. The transportation method of the unique codes (300) in not central to the present invention and can be carried out using known techniques such as secure file transfer over the Internet, or the unique codes might be transferred using any other suitable digital media.

The packaging management system (550) then carries out the process of marking the relevant unique codes onto the products. As a part of this process the packaging management system (550) will aggregate, establish and record all the unique codes (300) and also the association between all employed unique codes (300), i.e., association between a marked box and the marked packages it contains. The associations may be represented in a packaging hierarchy. This invention is not concerned with the actual methods and process of the aggregation as this might be performed in a multiple of ways serving the given circumstances.

In an embodiment of the invention the unique codes (300) are listed in a digital file (560), where its relationship with other unique codes (300) is uniquely indicated. It is important to observe that the unique codes (300) in this file are in clear text and is in fact the encrypted code by which the product or item (100) was marked as explained earlier.

Associated with every single unique code in this file (560) there may be a flag or status denomination, or other type of indication or relevant aspects concerning that individual unique code. These flags may indicate that the item (100) has been inspected, quarantined, reworked, and rejected, etc.

Further, every unique code may have one or several time stamp(s) associates to when it was marked, printed, scanned, etc or when a certain flag was linked to the item (100).

It is not a requirement that the unique codes (300) are collected and aggregated in a sequence that is the same as the sequence by which the unique codes (300) were originally delivered to the production system in the original transfer.

The file (560) may also contain group (200) information, common for all the unique codes (300), with product specific information such as batch number, line ID, Factory ID, expiry dates, product name, etc.

The resulting hierarchical packaging file (560) may then a safe way uploaded to the central track and trace system (500) in preparation for the initiation of the tracking or validation process.

In an embodiment the packaging management system (550) is communicating in real-time or near real-time with the track and trace system (500), tracking records (400) may be created before, during or after marking of an individual item (100), or before, during or after marking of related items (100), such as a box containing packages. Records for group specific information (401) may also be created in the system (500), comprising batch number, line ID, Factory ID, expiry dates, product name, etc.

Standard or proprietary protocols may be used for the transfer of information as will be understood by a person skilled in the art.

In the mark and aggregate use-case illustrated in FIG. 3, occurring preferably during a manufacturing or packaging process, the items (100) are marked with a unique code (300) from the group (200) of codes that was initially transferred to the packaging management system (550). All items (100) relevant for tracking and tracing or validation should be marked with a unique code (200). However there is no requirement in the present invention to mark all manufactured items. E.g. it would be possible to mark only every tenth produced item if it is found that this provides a sufficient level of security. Neither is it a requirement to mark the items (100) in any specific sequence of unique codes (300). In principle, any generated unique code (300) can be used to mark an item (100) according to the present invention.

In an embodiment of the invention, that may be implemented when the marked items do not have any relationship with other marked items, or it has been decided that the relationship should not be recorded, aggregation is not needed, and tracking records (400, 401) may be created in real-time or based on the packaging file (560) described above. Thus, when an item (100) is marked, a tracking record (400) may be created in the system (500) by decrypting the unique code (300) marked on the item (100) to get access to a unique reference (600) arranged for pointing to a storage location for one or more tracking records (400, 401) for the item (100). A tracking record (400, 401) is created in this storage location (700), comprising information specific for the item (100) and the production or packaging of the item (100), e.g., time, id, product number etc. In an embodiment the unique reference (600) is a unique storage address referenced by the group id (201) and the sequential number (202).

A tracking record (400, 401) may be a row in a database table or information in a file. It could also be serialised information in an item object representing the marked item (100). The actual implementation of the tracking record (400, 401) is not important for the invention and may be implemented as understood by a person skilled in the art.

According to an embodiment of the invention the relation nodes (620) comprises one or more flags (621) arranged for representing states of the items (100) represented by the relation nodes (620). In an embodiment a flag (621) is arranged to indicate that tracking records (400) cannot be created for an item (100) with a unique reference (600). In an embodiment the flags (621) are arranged to indicate that an item (100) is deemed to be withdrawn.

In the track use case additional information regarding the shipping and handling in the supply chain of the marked items (100) are added as tracking records (400, 401) to the system. In a similar manner to the mark and aggregate use case a tracking record (400, 401) may be created in the system by decrypting the unique code (300) marked on the item (100) to get access to a unique reference (600) arranged for pointing to a storage location (700) for one or more tracking records (400, 401) for the item (100). The tracking record (400, 401) is created in this storage location, comprising information specific for the item (100) in the specific, e.g., acceptance time, operator, etc. New tracking records (400, 401) may be added any number of times, depending on the needs and complexity of the supply chain. If a unique reference (600) is not available after the decryption process or the unique reference (600) is not recognised by the system, the code on the marked item has not been generated by the corresponding encryption process during the preparation use-case, and one could e.g. suspect that someone are trying to introduce other products into the supply chain.

According to the present invention the cleartext unique codes (300) marked on the item or product effectively can be represented by the unique reference (600) that may be stored in the code generation and validation or track and trace system (500). This means that the association or mapping of the stored unique references (600) with the correct unique codes (300) is impossible if the encryption method used is a one way function, such as a message digest algorithm, also known as hashing. This means that the protection of the stored data is enhanced significantly as there is no way of making sense of them without the assistance of the encryption process. Further this enables an embodiment of the invention where two processes can be separated and commutate in a safe way that makes both systems unavailable to any one single party. The encryption method used can be any encryption standard, such as e.g. DES, triple-DES, AES or any other suitable encryption algorithm providing the required encryption strength. It may also be combinations of obfuscation and hashing combined with encryption to make brute force attacks unfeasible, as it would be even more difficult to determine the correct unique reference.

However, a problem related to code generation and validation and track and trace, is that the encoding and decoding processes related to code generation, validation and track and trace are generally performed within one single system, or within a single system domain administered by the same system administrators. As a consequence, it could potentially be possible for someone being able to break into such a system to hack or tamper with the data for the sake of their own business, such as returning positive validation of marking codes on goods or products that should not have been validated. Also administrators of coded generation and authentication systems have the access to data and the system, and could potentially change the system to his own benefit. For some users of authentication services, this potential security risk may be a considerable problem, and they may prefer in-house solutions that may be less optimised just to be able to control the systems. Likewise, for the service provider it may be a problem to sell and market the service when customers do not fully trust the system.

As has been described above, the current invention provides a method and system that further ensures data integrity and security for the users of the system. The invention discloses a first subsystem that to a great extent solves the problems with code generation and validation or track and trace systems where someone that is able to break into the system will be able to tamper with the data. With the additional security provided by the present invention, it will be almost impossible to generate and validate a marking code or a set of codes by obtaining unauthorised access to the system, such as by hacking. It also greatly reduces the possibility that a single system administrator can be able to validate codes in the system if he is tempted to do so. In this embodiment the invention comprises a first key associated with the group id, and a second key, in separate subsystems administered by different system administrators.

A marked package can contain smaller packages or items. Each time a smaller package is included in a larger package we may say that a new level is added to the package hierarchy, where packages that have the same number of preceding parent packages defines a packaging level. For instance, a box with the unique code 56HJQWEDRF5TGH1, (parent code) contains twenty single packs among which the unique code S4R5T125KJHGTTRD (child code) was one of the single packs.

A tracking hierarchy, or tree structure reflecting the package hierarchy can be constructed in the validation or track and trace system to validate or track and trace the items more efficiently.

In FIG. 3 the term "aggregate" in the mark and aggregate use case relates to the construction of a tracking hierarchy corresponding to the relationships between marked items (100). In an embodiment of the invention the relation nodes (620) are arranged in a tree structure, and relationships between the relation nodes (620) represent packaging relationships between the items (100). Thus, a relation node (620) relates one-to-one to the tracked physical item (100).

A tracking hierarchy is a structure where all the unique references (600), has a relations to the other unique references (600). This makes a "family tree" or "pedigree" for all the unique references (600). The following definition may be applied for the tracking hierarchy of relation nodes (620) comprising unique references (600):

- A parent relation node (620) may have any number of child relation nodes (620).
- A parent relation node (620) may be a child relation node (620) of a preceding parent relation node (620)
- There is only one superparent (don), a superparent has no parent relation node (620), it is no child code.
- Relation nodes (620) that have the same number of preceding parent relation node (620) defines a level.

In a tracking hierarchy all the relations between the relation nodes (620) are known to the tracking system. Therefore when a parent relation node (620) is tracked, by default all its child relation nodes (620) may be "tracked" also. When a new tracking record for a parent relation nodes (620) is made, this data is not (explicitly) recorded for the child relation nodes (620). However it may inherit and use the data associated by inheriting it from the parent relation nodes (620).

In an embodiment of the invention the tracking records (400, 401) pointed to by one or more neighbouring relation nodes (620) of a relation node (620) referenced by a unique reference (600) are retrieved in the same request.

This methodology for tracking and tracing have at least three advantages:

- Very practical to track the outer packaging parent relation node (620) only (as opposed to track all items all the time)
- Gives an intuitive and excellent overview of the product flow of the supply chain
- Less disk storage and better retrieval times An advantage of the present invention is that the items are marked with unique encrypted codes, whereas the unique codes are unencrypted in the track and trace system. This requires less storage space and better retrieval performance than what is offered by track and trace systems according to background art.

A further advantage related to security is that there is no explicit relation between the unique encrypted codes marked on the item and the validation or tracking information.

In an embodiment of the invention a relation node (620) for each of one or more of the items (100) are created, wherein the relation nodes (620) are arranged in a tree structure, and relationships between the relation nodes (620) represent packaging relationships between the items (100), wherein one or more of the relation nodes (620) are arranged for referring to a unique storage location (700) for the item (100) represented by the relation node (620). 3. In an embodiment the unique references (600) are unique references to the relation nodes (620).

To trace an item as is depicted in the trace use case in FIG. 3, it is necessary to retrieve information from one or more of the tracking records (400) of the marked item (100) subject to the trace. To access the information the unique code (300) marked on the item (100) is entered in the validation or track and trace system according to the invention, whereby the unique code is decrypted with the unique key (350), and the resulting unique reference (600) points to the storage location of the tracking records (400) of the tracked item (100).

In an embodiment of the invention one or more of the items (100) marked with the unique codes (300) are traced, by decrypting the unique codes (300) with the unique keys (350, 351) to obtain the unique references (600) and retrieving one or more of the tracking records (400) corresponding to the marked items (100) from the storage locations (700) referred to by the unique references (600).

In an embodiment of the invention tracking records (400, 401) for items (100) in a packaging relationship to the traced items (100) are retrieved by looking up one or more neighbouring relation nodes (620) of the relation node (620) corresponding to the traced item (100), and retrieving tracking records (400, 401) from the unique storage location (700) referred to by the neighbouring relation nodes (620).

The authenticate use case in FIG. 3 is from a technical point of view similar to the trace use case. However, in the trace use case a known unique number is used for tracing an item, whereas in the authenticate use case, the marked item is usually available, and the user wants to authenticate the item. In this case the user reads the number on the item (100) and enters the number in the track and trace system, whereby the unique code is decrypted with the unique keys (350, 351). If a unique reference (600) is available after the decryption process and the unique reference is recognised by the system, the authentication succeeded and the item marked with the code is valid.

To enable structuring of the information related to the manufacturing or packing process and the marked items, the unique reference may be made up of more than one sub-reference. In an embodiment the unique reference (600) comprises a first level reference and a second level reference wherein the second level reference is unique within the first level reference. In this embodiment the first level reference may represent the group (200) in the form of a unique group identifier (201), and the second level reference may represent a sequence number (202) within the group. The multi-level reference allows information to be structured. Specific parameters common to all items (100) within a group (200) can be stored in a common group record (401) being referenced by the first level reference (201).

According to an embodiment of the invention one or more of the relation nodes (620) are stored in flat files.

The packaging tree may in an embodiment be implemented in a file structure called a compass (610) as indicated in FIG. 2. The compass (610) file structure may be implemented as one or more files. The compass (610) file arranged for comprising relation nodes (620) may in this embodiment be implemented as three physical files. One header file for holding information about the number of nodes, field sizes etc, another file for keeping meta-information about the nodes as well as pointers to related nodes like parent node and child nodes, and a third file working as an index for fast child lookups. The file format is based on two very important factors, which is that one can quickly fetch the group reference (201) and the sequence number (202) within that group (200).

The header file may hold information about field sizes used in the next two files. It may also hold information about group (200) aliases. The aliasing is done to save disk space by avoiding using the full group id, but instead using a single byte as an alias. The file may be in XML format, but since it is storing simple metadata values, other formats can also be used.

The reference file may be a fixed binary fixed entry-width file. The field sizes and thus the entry length is adaptable depending on how many nodes needs to be stored in the tree file. The group (200) is used to find the correct file for the tree-structure, and then the sequence number (202) of the unique reference (600) may be directly linked to a position in the file.

In the reference file, each relation node (600) may comprise the following:

Parent unique reference (600)
Child collection offset (The offset of the child collection, file 3)
Child collection count (The amount of child entries in file 3)
Metadata information The child collection file works as a reverse index, allowing one to fetch all children of a node in a single read. In an embodiment it comprises:

Order id alias
Code index

According to the invention it is possible to manage unique codes and hierarchical packaging without storing the marking codes (300) in a database or conventional retrieval system.

It will in the following be described how the tracking information will be stored and retrieved according to present invention.

Tracking information is most significantly concerned with the recording and storing of what, where, who and when. Other information can also be stored as determined important for the user, however in relation to the present invention this is a choice that should made to suit the relevant business circumstances as understood by a person skilled in the art.

The concepts of a tracking cell and a tracking cell controller will now be introduced with reference to FIG. 3.

A tracking cell (520) is a sub-system of the overall code generation and validation or track and trace system (500) that is arranged for storing and retrieving validation and tracking information, in essence consisting of a computer system and a suitable database system or the type of storage and retrieval system. The tracking cell (520) may store and manage an amount of groups (200) that may correspond to orders in a manufacturing plant, that has a given population of unique codes (300) that may be adjusted to underlying system of the tracking cell (520), so that a given acceptable performance is ensured by the given tracking cell (520) based on the known performance parameters of the given system. The tracking cell (520) can in such a way serve a given number of groups (200) and unique codes (300) belonging to those groups (200). The design, as well as the individual software and hardware components by which the design is realized, of the tracking cell (520) is not essential to the present invention. It is however evident that since the tracking cell (520) can be completely independent of all the other of tracking cell (520), its design can be quite uncomplicated as opposed to monolithic systems handling a large amount of data.

In an embodiment of the present invention a tracking cell (520) is storing the unique references (600) by building and managing a first index using the group (200) and a secondary index using the serial number of the unique code (300) within the group (200).

According to an embodiment of the invention the code generation and validation system or track and trace system (500) comprises one or more tracking cells (520), each arranged for managing a subset of the unique storage locations (700).

In the same way, a tracking cell (520) may also be arranged for managing a subset of the relation nodes (620). The subset of relation nodes (620) managed by a specific tracking cell (510) will typically be one or more packaging sub-trees, where the relation nodes (620) are related.

The tracking cells (520) are communicating both ways (in either direction) with one or more tracking cell controllers (510) via know computer and networking techniques and so-called API's and similar techniques.

The tracking cell controllers (510) keep a managed repository that identifies and manages the communication link with each of the tracking cells (520) that are part of the overall code generation and validation or track and trace system (500).

Another function of the tracking cell controller (510) may be to build, update and manage a second key repository, which also can be in the form of a database of some type or similar to suit the needs. The tracking cell controller stores which groups (200) are stored in specific tracking cells (520) managed by the tracking cell controller (510). In an embodiment a tracking cell controller (200) may allow a group (200) to be shared among several tracking cells (520), and thus keep track of which part of the group (200) that is handled by each specific tracking cell (520) involved.

In an embodiment the track and trace system (500) comprises one or more tracking cell controllers (510), each arranged for controlling one or more of the tracking cells (520).

According to an embodiment of the present invention one or more of the tracking cell controllers (510) are arranged for assigning the responsibility to tracking cells (520) for managing a subset of the unique storage locations (700) for one or more of the groups (200).

The tracking cell controller (510) is further storing other system information to manage the overall system to meet specific operational parameters such as performance and system data about the software and hardware on the individual tracking cells (520).

The tracking cell controller (510) can based on the monitored data assist the administrator or trigger a predefined process to obtain certain operational adjustments. For instance the tracking cell controller (510) will alert when one or all the tracking cells (520) employed does not any longer meet the performance criteria that has been predetermined by an administrator. Such criteria can be, but not limited to, response time or full usage of disk storage. The tracking cell controller (510) can then automatically build a new tracking cell (520) to accommodate the required addition of performance as a consequence of more data managed and stored by the overall code generation and validation or track and trace system (500).

The tracking cell controller (510) may also be able to detect situations were a tracking cell (520) is not available (downtime) and build or restore the tracking cell (520) onto another hardware and software system based on and in communication with a backup system. This might be accomplished by hereto known techniques. Likewise if the tracking cell controller (510) detects that a given tracking cell (520) is not able to meet the performance that is required because of a too large number of users, it can as described above deploy and manage a "clone" of a given tracking cell (520).

In an embodiment of the invention a cell controller (510) is arranged for performing backup of one or more of the tracking cells (520) under the control of the cell controller (510) and further arranged for replicating the tracking cells (520).

It is also a part of this invention that in the case that a tracking cell controller (510) does not longer persist the required performance to manage the tracking cells (520) assigned to it, a tracking cell controller can be implemented.

Cell controllers may be arranged in a redundant system architecture to avoid a single point of failure. Any known form of redundancy may be used to improve the availability of the system, such as hardware redundancy, information redundancy etc.

In an embodiment of the invention two or more cell controllers (510) are arranged in a redundant system architecture, and one or more of the cell controllers (510) are arranged for taking over the responsibility of one or more of the other cell controllers (510) in the redundant system architecture.

It will in the following be described how the code generation and validation or track and trace system (500) will record and add a new tracking record (400, 401).

To instigate a new tracking is requested to be recorded and stored in the system, a unique code (300) is transferred and captured by the system (500) along with the tracking information that is constituting the new requested tracking record (400). The unique code (300) is decrypted which process will extract and present the group (200) number (201) and internal sequence number (202) for the code within that group (200). If the decryption and authentication of an arbitrary code is unsuccessful, i.e. the code is not a valid unique code (300), the request is denied. This process also must determine if the level that requested code is belonging to is currently allowed to be tracked, in other words the code has been split as will be described below.

If the process is successful the information is conveyed to the file system where the appropriate compass (610) file will be retrieved and accessed based on the group number (201) and sequence number (202) information so made available.

This information will then be conveyed to the tracking cell controller (510). The tracking cell controller (510) will retrieve which tracking cells(s) (520) that are storing that group (200). The tracking cell controller (510) will then convey the information to the identified tracking cell(s) (520) and the tracking cell (520) will be instructed to insert and store the new requested tracking information as appropriate associated to the group number (201) and sequence number (202). A new tracking record (400, 401) has now been recorded and committed. The protocol for ensuring that the tracking record (400, 401) is not lost or otherwise compromised by software may use known such techniques such as ACID and distributed transaction techniques and protocols.

It will in the following be described how the system will retrieve the complete tracking history of a unique code (300). A complete tracking of a unique code (300) will be performed for the recorded tracking of all the levels in a straight vertical direction.

A unique code (300) is conveyed to a process by which the system will start a searching and retrieval process. The unique code (300) is decrypted in the first and second subsystems (501, 502) as described above. which process will extract and present the group number (201) and internal sequence number (202) for the unique code (300). If the decryption and authentication of an arbitrary code is unsuccessful i.e. the code is not a valid unique code (300) the request is denied.

If the process is successful the information is conveyed to the file system where the appropriate compass (610) file will be retrieved and accessed based on the group number (201) and sequence number (202) information available. The compass (610) files or collection of files will further retrieve and establish the vertical "family" line of the requested unique code. In effect if as an example 344 (sequence number by which the tracking has been requested), this vertical family line might be 255-3225-344-211-588. Any flags or other statuses that might be recorded in the file is also retrieved and used in the remainder of the process.

This information will then be conveyed to the tracking cell controller (510). The tracking cell controller (510) will retrieve which tracking cells(s) (520) that are storing that group number (201). The tracking cell controller (510) will then convey the information to the identified tracking cell(s) (520) and the tracking cell (520) will be instructed to search and retrieve the tracking information as appropriate associated to the group number (201) and sequence numbers (202) and established family vertical group. The tracking cell(s) (520) will now retrieve all the tracking records (400, 401) to present the complete tracking tree. It is another distinctive advantage with the present invention that all the tracking records (400, 401) and entries can be searched and retrieved independently and in parallel due to the fact that family relations are known and resolved before engaging the database search residing on the tracking cell(s) (520).

An aspect of the present invention is that as the product or item (100) is flowing in the supply chain only the top unique code (300) will be allowed tracked and traced. As a part of the process therefore it will be checked whether the level is still trackable. This goes for both higher levels and well as lower levels for the hierarchy in question. This will henceforth be referred to as a split tracking, i.e. The braking up of the hierarchy so that the "child" of the father now has been activated for tracking and tracing process.

As will be understood by a person skilled in the art, the code generation and validation or track and trace system (500) and its subsystems (501, 502) and tracking managers (510) and tracking cells (520) may be implemented in one or more computer networks where the tasks described above for the subsystems (501, 502) and tracking managers (510) and tracking cells (520) may run in one or more processes in one or more computers within the computer networks.

According to an embodiment of the invention the code creation and validation system (501) may store information related to the lifecycle of the marked item, as described above for track and trace systems. This may be best before date, an indication that the item has been stolen, withdrawn, or otherwise is not any longer in the market, or should not longer be in the market, etc. This type of information may be related to the batch of products, such as the group id according to the invention, or each specific item or marking code. In an embodiment the dynamic lifecycle management of the marked items as described above is implemented as one or more flags in the code generation and validation system (501) that may be set by an operator of the system. The flags may be specific data fields assigned for this purpose in a tracking record (400), or they may be directly related to the unique combination of the group id (201) and sequential number (202) in the appropriate compass (610) file as described above.

In an embodiment of the invention the code generation and validation system (501) stores information about the items (100) to be marked. Such information may be manufacturing date, manufacturing site, manufacturing process, product name, best before date, product metadata etc. According to an embodiment of the invention such information may be related to the batch level, i.e. group id (201) in this case, or to each specific marking code (300). Such information may be entered into the code generation and validation system (501) at any time before, during or after marking or manufacturing. Upon a successful validation of a marking code the product specific information is, in one embodiment of the invention, returned with the validation result to the person or system that initiated the validation process.

In an embodiment the method according to the invention comprises the step of looking up a stored group record (401) representing the group id (201) in the first subsystem (501), and invalidating the marking code (300) if the stored group record (401) indicates that the items (100) marked with marking codes (300) within a group (200) with a group id (201) are not valid.

In an embodiment the method according to the invention comprises the step of looking up a stored group record (401) representing the group id (401) in the first subsystem (501), and returning product related information in the stored group record (401) with the validation response.

In an embodiment the method according to the invention comprises the step of looking up a stored item record (400) representing a combination of the group id (201) and the sequential number (202) in the first subsystem (501), and invalidating the marking code (300) if the stored item record ( ) indicates that the item (100) marked with marking code (300) is not valid.

In an embodiment of the invention the validation information in the stored item record (400) is stored in one or more flags (402).

In an embodiment the method according to the invention comprises the step of looking up a stored item record (400) representing a combination of the group id (201) and the sequential number (202) in the first subsystem (501), and returning item related information in the stored item record (401) with the validation response.

In an embodiment of the invention the resistance to a malicious adversary may be different from a group of marking codes to another. As there are certain problems related to too long marking codes, only the length necessary for the specific batch or product type should be used. Depending on the product type, or supply chain, requirements may also be different. This embodiment comprises setting a requirement for a desired resistance of the marking code (300), and concatenating the code relative identifier (203), the group identifier (201) and a required number of characters corresponding to a required resistance requirement of the second output message (360) to obtain the combined code (205).

What is claimed is:

1. A computer-implemented method for creating a group of marking codes for marking items in a code generation and validation system including a first subsystem and a second subsystem, said method comprising the steps of:
creating a group identifier for said group and associating said group identifier with a first key being unique for said group; and
for each of said marking codes in said group:
deriving a code relative identifier from a sequential number being unique within said group;
merging said code relative identifier, said group identifier and said key to obtain a first input message;
encoding in said first subsystem said first input message with a first one way function to obtain a first output message;
merging in said second subsystem said first output message and a second key to obtain a second input message;
encoding in said second subsystem said second input message, with a second one way function to obtain a second output message; and
merging said code relative identifier, said group identifier and one or more characters of said second output message to obtain a merged code, said merged code being said marking code, wherein said step of deriving said code relative identifier from said sequential number comprises one or more sequential steps (N) where each (i) of said steps (N) comprises:
combining an input value ($x_i$) with a processed input value ($f_i$) to an output value ($z_i$), where said input value ($x_i$) of the next sequential step (i+1) is the output value ($z_i$) of the current sequential step (i), wherein said input value ($x_1$) of the first of said sequential steps (i=1) is said sequential number, and said output value of said last sequential step (i=N) is said code relative identifier.

2. The method according to claim 1, wherein said second key is associated with said group identifier.

3. The method according to claim 1, wherein said step of encoding said input message with a one way function to obtain a key message digest comprises one or more sequential steps (M) where each (j) of said steps (M) comprises:
combining an input value ($x_j$) with a processed input value ($fj_i$) to an output value ($z_j$), where said input value ($x_j$) of the next sequential step (j+1) is the output value ($z_j$) of the current sequential step (j), wherein said input value ($x_j$) of the first of said sequential steps (j=1) is said input message, and said output value of said last sequential step (j=M) is said key message digest.

4. The method according to claim 1, wherein said one way function is a cryptographic one way function.

5. The method according to claim 1, further comprising the step of rearranging positions of characters of said merged code in a rearranging function, wherein said specific rearranging function used is indicated by a value in a fixed position of said combined code, a result of said rearranging function is a rearranged concatenated code, and a specific inverse rearranging function is indicated by a value in a fixed position of said rearranged concatenated code, said rearranged concatenated code being said marking code.

6. The method according to claim 1, further comprising the steps of:
setting a requirement for a desired resistance of said marking code; and
concatenating said code relative identifier, said group identifier and a required number of characters corresponding to a required resistance requirement of said second output message to obtain said combined code.

7. A computer-implemented method for authenticating an item marked with a marking code in a code generation and validation system including a first subsystem and a second subsystem, said method comprising the steps of:
entering said marking code in said first subsystem, wherein said marking code is an incoming merged code comprising an incoming code relative identifier, an incoming group id and an incoming second output message;
deriving an incoming sequential number from said incoming code relative identifier in said incoming merged code;
comparing said incoming group identifier to a group identifier and invalidating said marking code if the incoming group identifier and the group identifier are not identical;
comparing said incoming sequential number to existing sequential numbers within a group indicated by said group id and invalidating said marking code if the incoming sequential number and the existing sequential numbers are not identical;
merging said code relative identifier, said group identifier and said key to obtain a first input message;
encoding in said first subsystem said first input message with a first one way function to obtain a first output message;
merging in said second subsystem said first output message and a second key to obtain a second input message;
encoding in said second subsystem said second input message with a second one way function to obtain a second output message; and
comparing said incoming second output message with said second output message and invalidating said marking code if the incoming second output message and the second output message are not identical, where said step of deriving said incoming sequential number from said incoming code relative identifier comprises one or more sequential steps (N) where each (i) of said steps (N) comprises:
combining an input value ($x_i$) with a processed input value ($f_i$) to an output value ($z_i$), wherein said input value ($x_i$)

of the next sequential step (i+1) is the output value ($z_i$) of the current sequential step (i), wherein said input value ($x_1$) of the first of said sequential steps (i=1) is said incoming code relative identifier, and said output value of said last sequential step (i=N) is said incoming sequential number.

8. The method according to claim 7, wherein said second key is associated with said group identifier.

9. The method according to claim 8, further comprising the step of rearranging positions of characters of said marking code being an incoming rearranged concatenated code in an inverse rearranging function, where said inverse rearranging function used is indicated by a value in a fixed position of said incoming rearranged concatenated code, wherein a result of said inverse rearranging function is said incoming merged code.

10. The method according to claim 9, further comprising the steps of:

comparing said incoming second output message with said second output message in said first subsystem and invalidating said marking code if the incoming second output message and the second output message are not identical;

sending a validation response from said first subsystem;

comparing said incoming second output message with said second output message in said second subsystem and invalidating said marking code if the incoming second output message and the second output message are not identical; and sending a validation response from said second subsystem.

11. The method according to claim 10, further comprising the steps of:

looking up a stored group record representing said group id in said first subsystem; and invalidating said marking code if said stored group record indicates that the items marked with marking codes within a group with a group id are not valid.

12. The method according to claim 11, further comprising the steps of:

looking up a stored item record representing a combination of said group id and said sequential number in said first subsystem, and invalidating said marking code if said stored item record indicates that the item marked with marking code is not valid.

13. A computerised code generation and validation system for authenticating an item marked with a marking code, comprising:

a first subsystem with a first processor; and a second subsystem with a second processor, wherein said first subsystem, is configured to create a group identifier for said group and associate said group identifier with a first key being unique for said group, and for each of the marking codes in said group, said first subsystem is configured to:

derive a code relative identifier from a sequential number being unique within said group;

merge said code relative identifier, said group identifier and said key to obtain a first input message; and encode in said first subsystem said first input message with a first one way function to obtain a first output message, wherein said second subsystem is configured to merge said first output message and a second key to obtain a second input message and encode said second input message with a second one way function to obtain a second output message, and wherein said first subsystem is configured to merge said code relative identifier, said group identifier and one or more characters of said second output message to obtain a merged code, said merged code being said marking code, wherein said step of deriving said code relative identifier from said sequential number comprises one or more sequential steps (N) where each (i) of said steps (N) comprises:

combining an input value ($x_i$) with a processed input value ($f_i$) to an output value ($z_i$), where said input value ($x_i$) of the next sequential step (i+1) is the output value ($z_i$) of the current sequential step (i), wherein said input value ($x_1$) of the first of said sequential steps (i=1) is said sequential number, and said output value of said last sequential step (i=N) is said code relative identifier.

\* \* \* \* \*